US008375328B2

(12) United States Patent
Koh et al.

(10) Patent No.: US 8,375,328 B2
(45) Date of Patent: Feb. 12, 2013

(54) IMPLEMENTING CUSTOMIZED CONTROL INTERFACES

(75) Inventors: Justin Koh, Mountain View, CA (US); Vincent Dureau, Palo Alto, CA (US); Michael Wakerly, Mountain View, CA (US)

(73) Assignee: Google Inc., Mountain View, CA (US)

( * ) Notice: Subject to any disclaimer, the term of this patent is extended or adjusted under 35 U.S.C. 154(b) by 298 days.

(21) Appl. No.: 12/616,516

(22) Filed: Nov. 11, 2009

(65) Prior Publication Data
US 2011/0113353 A1 May 12, 2011

(51) Int. Cl.
G06F 3/00 (2006.01)
(52) U.S. Cl. ......... 715/810; 715/738; 715/733; 715/205
(58) Field of Classification Search ................. 715/810, 715/738, 733, 205
See application file for complete search history.

(56) References Cited

U.S. PATENT DOCUMENTS

| | | | |
|---|---|---|---|
| 7,100,069 B1 | 8/2006 | Hickman et al. | |
| 7,158,047 B2 * | 1/2007 | Ushida | 340/12.54 |
| 7,743,012 B2 * | 6/2010 | Chambers et al. | 709/203 |
| 8,054,294 B2 * | 11/2011 | Sakai et al. | 345/169 |
| 2001/0038392 A1 * | 11/2001 | Humpleman et al. | 345/733 |
| 2006/0150120 A1 * | 7/2006 | Dresti et al. | 715/810 |
| 2007/0078850 A1 | 4/2007 | Aziz et al. | |
| 2007/0203891 A1 | 8/2007 | Solaro et al. | |
| 2007/0276845 A1 | 11/2007 | Geilich | |
| 2008/0228675 A1 | 9/2008 | Duffy et al. | |
| 2009/0055749 A1 * | 2/2009 | Chatterjee et al. | 715/738 |
| 2009/0235149 A1 * | 9/2009 | Frohwein | 715/205 |

FOREIGN PATENT DOCUMENTS

| | | |
|---|---|---|
| WO | WO 01/19160 | 3/2001 |
| WO | 2008/002274 | 1/2008 |

OTHER PUBLICATIONS

Document entitled "Android DACP Remote Control," available at http://dacp.jsharkey.org/, printed on Sep. 30, 2009.
Document entitled "Pairing the Itunes Remote app with your own server," available at http://blog.mycroes.nl/2008/08/pairing-itunes-remote-app-with-your-own.html, dated Aug. 8, 2008, printed on Sep. 30, 2009.
Document entitled "Android Remote," available at http://www.brentonklik.com/2009/08/android-remote/, dated Aug. 29, 2009, printed on Sep. 30, 2009.
Dontcheva, M., Drucker, S., Salesin, D., Cohen, M., "Relations, Cards, and Search Templates: User-Guided Data Integration and Layout," UIST '07, pp. 61-70 (Oct. 7-10, 2007).
B. Amento, L. Terveen, and W. Hill, Experiments in social data mining: The TopicShop system. ACM Trans. on Computer-Human Interaction, pp. 54-85 (2003).

(Continued)

*Primary Examiner* — Michael Roswell
(74) *Attorney, Agent, or Firm* — Fish & Richardson P.C.

(57) ABSTRACT

Systems and techniques by which a single electronic device can implement a variety of customized control interfaces. The control interfaces can be tailored to specific operations performed the device which is controlled. In one aspect, computer-implemented methods for controlling a web-based application include providing, from a server, a web page that includes a web-based application and a uniform resource identifier specifying a control interface for the web-based application and transmitting the control interface specified by the uniform resource identifier to a client for use in controlling the one or more functions of the web-based application. The control interface is configured to permit a user to control one or more functions of the web-based application from a mobile device.

36 Claims, 8 Drawing Sheets

OTHER PUBLICATIONS

S. Card, G. Roberston, and W. York, "The WebBook and the Web Forager: An information workspace for theWorld-WideWeb," Proc. of SIGCHI, pp. 111-117 (1996).

M. Dontcheva, S. M. Drucker, G.Wade, D. Salesin, and M. F. Cohen, "Summarizing personalWeb browsing sessions," Proc. of UIST, pp. 115-124 (2006).

A. Y. Halevy, A. Rajaraman, and J. J. Ordille. "Data integration: The teenage years," Proc. of VLDB, pp. 9-16 (2006).

A. Hogue and D. Karger, "Thresher: automating the unwrapping of semantic content from the World Wide Web," Proc. of WWW, pp. 86-95 (2005).

D. Huynh, S. Mazzocchi, and D. Karger, "Piggy Bank: Experience the semantic web inside your Web browser," Proc. of ISWC, pp. 413-430 (2005).

U. Irmak and T. Suel, "Interactive wrapper generation with minimal user effort," Proc. of WWW, pp. 553-563 (2006).

T. Kristjansson, A. Culotta, P. Viola, and A. McCallum, "Interactive information extraction with constrained conditional random fields," Proc. of AAAI, pp. 412-418 (2004).

J. Madhavan, S. Cohen, X. L. Dong, A. Y. Halevy, S. R. Jeffery, D. Ko, and C. Yu, "Web-scale data integration: You can afford to pay as you go," Proc. of CIDR, pp. 342-350 (2007).

G. Robertson, M. Czerwinski, K. Larson, D. Robbins, D. Thiel, and M. van Dantzich, "Data mountain: using spatial memory for document management," Proc. of UIST, pp. 153-162 (1998).

M. Schraefel, Y. Zhu, D. Modjeska, D. Wigdor, and S. Zhao, "Hunter Gatherer: interaction support for the creation and management of within-web-page collections," Proc. of WWW, pp. 172-181 (2002).

A. Sugiura and Y. Koseki, "Internet Scrapbook: automating Web browsing tasks by demonstration," Proc. of UIST, pp. 9-18 (1998).

P. Viola and M. Narasimhan, "Learning to extract information from semi-structured text using a discriminative context free grammar," Proc. of SIGIR, pp. 330-337 (2005).

S. Ye, T.-S. Chua, J. Kei, "Querying and Clustering Web Pages about Persons and Organizations," Proceedings of the IEEE/WIC International Conference on Web Intelligence (WI'03) (2003).

K. Tokunaga, et al., "Automatic Discovery of Attribute Words from Web Documents," R. Dale et al. (Eds.): *IJCNLP 2005, LNAI 3651*, pp. 106-118, 2005, Springer-Verlag, Berlin, Heidelberg 2005.

Authorized officer Athina Nickitas-Etienne, International Preliminary Report on Patentability in PCT/US2010/056338, mailed May 24, 2012, 7 pages.

\* cited by examiner

IMPLEMENTING CUSTOMIZED CONTROL INTERFACES

BACKGROUND

Modern electronic devices provide a staggering array of functionality to users. Portable handheld electronic devices such as telephones, music players, PDA's, and game players can display information on display screens, receive instructions from a user, communicate with other devices using wired and wireless data links, take digital photographs, and process large volumes of digital data at speeds that were unthinkable even a generation ago.

Such functionality can be provided, in part, using graphical displays that act as both inputs and outputs. For example, touch screens include a display screen and detect the presence and location of manual interaction with that display screen. A user can interact with the elements shown on the display screen intuitively, in ways that resemble the ways that humans interact with the world outside of graphical displays and electronic devices.

SUMMARY

This specification describes systems and techniques by which such electronic devices can implement a variety of customized control interfaces. A control interface is a user interface that allows the user to input commands and control a device. One example of a control interface is a remote control, which allows a user to input commands and control, e.g., a TV set or a compact disc player. Another example of a control interface is the joystick, which allows a gamer to input commands and control a video game system. Yet another example of a control interface is the remote control for a toy car or airplane.

Such control interfaces are generally tailored to the specific operations performed by the devices which are controlled. For example, TV remote controls commonly include buttons that allow a user to switch channels. As another example, the orientation joystick can be sensed and translated into corresponding directional movement in a video game. As yet another example, the remote control for a toy car can allow a child to control how fast the car goes. In other words, the control interfaces are customized to the devices which are controlled.

Such customized control interfaces have often been separate devices that are dedicated to interoperation with specific devices. Indeed, even so-called "universal" remote controls will generally only allow a user to input commands and control a few select devices.

This specification describes systems and techniques by which a single electronic device can implement a variety of customized control interfaces.

Accordingly, in a first general aspect, computer-implemented methods for controlling a web-based application are described. Methods according to this aspect include providing, from a server, a web page that includes a web-based application and a uniform resource identifier specifying a control interface for the web-based application and transmitting the control interface specified by the uniform resource identifier to a client for use in controlling the one or more functions of the web-based application. The control interface is configured to permit a user to control one or more functions of the web-based application from a mobile device.

This and other aspects can include one or more of the following features. The server can provide a second web page that includes the uniform resource identifier specifying the control interface. The uniform resource identifier need not be visible to a user viewing the rendered web page. The transmission of the control interface can occur automatically when a web browser accesses the provided web page that includes the web-based application and the uniform resource identifier. The transmission of the control interface can occur in response to a user selection of a visible representation of the uniform resource identifier. The control interface can include visual elements that are customized to control the web page or the web-based application from an electronic device comprising a display screen acting as both an input and an output. The web page can be provided to a television set or to a desktop personal computer. The web-based application can include media player functionality.

The server can provide the web page to a data processing device that is in data communication with the mobile device over a wireless data communication path. The data processing device and the mobile device can be associated with a same user. The server can store a record of the associations of the data processing device and the mobile device with the same user. The server can receive credentials identifying the same user from both the data processing device and the mobile device.

Other embodiments of this aspect include corresponding systems, apparatus, and computer programs, configured to perform the actions of the methods, encoded on computer storage devices.

In a second general aspect, methods are described. Methods according to this aspect include a mobile device transmitting commands to a primary client using a generic control interface, the mobile device receiving notification of a control interface customized for use in controlling one or more functions of a web-based application from the mobile device, the mobile device implementing the customized control interface, and the mobile device transmitting commands for controlling the web-based application to the primary client using the customized control interface. The notification of the control interface is transmitted to the mobile device automatically in response to a primary client navigating to the web-based application.

This and other aspects can include one or more of the following features. The mobile device can include a display screen configured to act as both an input and an output. The mobile device can receive instructions for presenting a representation of the customized control interface on the display screen and rules for translating user interaction with the customized control interface into high level commands tailored to the web-based application. The control interface can be customized to the mobile device as well.

The mobile device can transmit commands for controlling a second web-based application to the primary client using the customized control interface. The control interface can be customized for use in controlling one or more functions of the second web-based application as well. The mobile device can include a display screen configured to act as both an input and an output. The mobile device can switch between presenting the generic control interface and the customized control interface in response to user interaction with the display screen.

Other embodiments of this aspect include corresponding systems, apparatus, and computer programs, configured to perform the actions of the methods, encoded on computer storage devices.

In a third general aspect, systems for controlling a web-based application are described. The systems include one or more servers providing a web page that includes a web-based application and a uniform resource identifier specifying a control interface for the web-based application, instructions for implementing the control interface on the mobile device, and one or more data exchange interfaces for conveying the web page and the instructions to other data processing devices over one or more data communication paths. The control interface is configured to permit a user to control one or more functions of the web-based application from the mobile device. The instructions are identifiable using the uniform resource identifier.

Other embodiments of this aspect include corresponding methods, apparatus, and computer programs, configured to perform the actions of the systems, encoded on computer storage devices.

In a fourth general aspect, devices are described. Devices according to this aspect include a web server serving a web application. The web application comprises a link element specifying a relationship between the web application and a customized control interface that is implementable on an electronic device that includes a display screen acting as both an input and an output. The customized control interface is customized to control operations performed by the web application via input received over the display screen of the electronic device. The link element comprising a uniform resource identifier that identifies where the customized command interface is available.

This and other aspects can include one or more of the following features. The web application can include a head and a body, the link element being a sub-element of the head. The link element can specify a forward link from the web application to the control interface. The web application can be structured using HTML. The control interface can be customized to the electronic device which is to implement the control interface as well. The web server can be a media server or a video game server.

The web server can include a second web application. The second web application can include a second link element specifying a relationship between the second web application and the customized control interface. The customized control interface can be customized to control operations performed by the second web application as well.

Other embodiments of this aspect include corresponding methods, system, and computer programs, configured to perform the actions of the devices, encoded on computer storage devices.

In a fifth general aspect, systems are described. Systems according to this aspect include an electronic device, a primary client device comprising a data transmission system, and a server configured to provide services to the primary client in response to requests for the services and advertise a control interface customized to the services. The electronic device includes a data transmission system, a display screen acting as both an input and an output, and a data store storing instructions for presenting one or more control interface representations on the display screen. The server includes a data transmission system. The primary client device is configured to recognize an advertisement of the customized control interface and notify the electronic device of the customized control interface. The electronic device is configured to implement the customized control interface. The data transmission systems of the electronic device, the primary client device, and the server placing at least the electronic device in data communication with the primary client device and the primary client device in data communication with the server.

Other embodiments of this aspect include corresponding methods, devices, and computer programs, configured to perform the actions of the systems, encoded on computer storage devices.

In another aspect, methods are described. Methods according to this aspect include a server providing services to a primary client device, the services including an advertisement of a control interface that is customized to the services provided by the server, the primary client device recognizing the advertisement of the control interface, the primary client device notifying a hand-held control device about the control interface, the hand-held control device receiving the notification of the control interface, and the control device implementing the control interface automatically without additional input from a user.

Other embodiments of this aspect include corresponding systems, devices, and computer programs, configured to perform the actions of the methods, encoded on computer storage devices.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
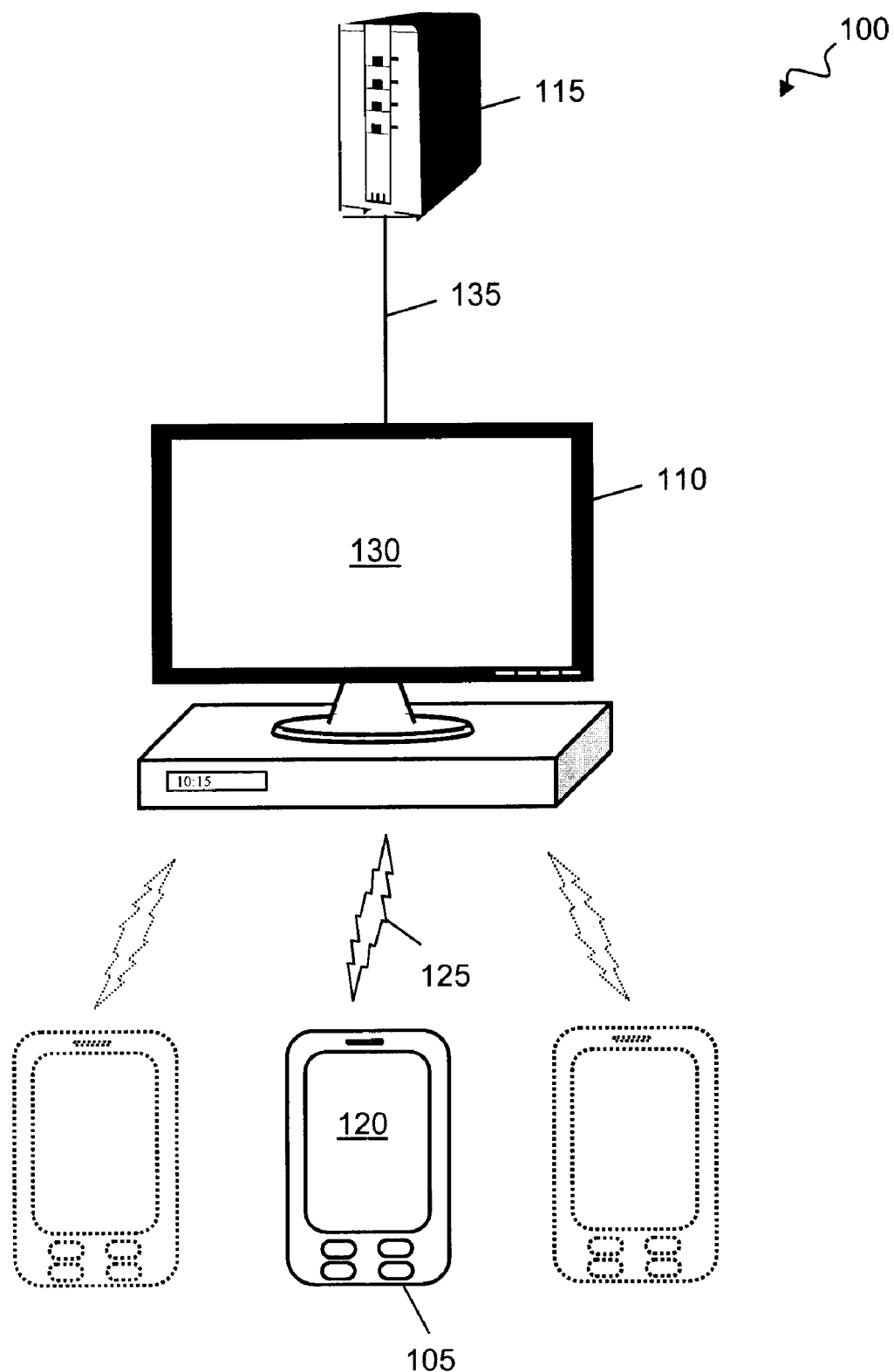
FIG. 1 is a schematic representation of a system in which a variety of customized control interfaces can be implemented.

FIG. 1 is a schematic representation of a system 100 in which a variety of customized control interfaces can be implemented by individual devices that each include a display screen that acts as both an input and an output (i.e., "control devices"). System 100 includes one or more control devices 105 each including a touchscreen 120, as well as a primary client 110 and a server 115. Touchscreen 120 can present a variety of different customized control interfaces and thereby allow a user to input commands and control other devices in system 100, as discussed further below.

Each control device 105 can be, e.g., a computer, a telephone, a music player, a PDA, a video game console, or the like. In some implementations, control devices 105 can be wireless, hand-held devices, as shown. In some implementations, control devices 105 can each include an embedded web browser that implements the customized control interfaces. Each control device 105 can include a wired or wireless transmitter and receiver and can communicate with primary client 110 over a data communication path 125. In some implementations, data communication path 125 is a wireless 2-way IP channel between control device 105 and primary client 110.

Primary client 110 is a client device that can receive services from server 115. Primary client 110 can be implemented on a computer programmed with machine-readable instructions. For example, primary client 110 can host a web browser that is configured to retrieve and navigate web applications served by server 115. The web applications can include electronic documents having static elements, interactive elements, or both.

In some implementations, primary client 110 and control device 105 can be associated with a same user. The associations can be identified to control device 105, e.g., by primary client 110 and control device 105 both presenting information identifying a respective association to server 115. For example, in some implementations, credentials identifying the user can be received at server 115 from both primary client 110 and control device 105. In some implementations, server 115 stores a record of the associations.

Primary client 110 can include a display screen 130 and one or more wired or wireless transmitters and receivers. Primary client 110 can communicate with control device 105 over data communication path 125 and with server 115 over a data communication path 135. In some implementations, data communication path 135 can include a communications network such as the Internet.

Server 115 is any combination of hardware or software designed to provide services to clients. Server 115 can be implemented on one or more computers programmed with machine-readable instructions such as, e.g., a server operating system. Server 115 can be, e.g., a web server on the Internet or on a private network. Server 115 can serve, e.g., web applications that contain text, picture, video, audio, and other media. Server 115 can one or more data exchange interfaces that allow server to exchange data with primary client 110 or with both primary client 110 and control device 105 over communication path 135.

In operation, a publisher can publish a customized control interface that is tailored to performing specific operations with an application served by server 115. In general, the application is a web application. In some implementations, the customized control interface allows users interacting with control devices 105 to request services from server 115. In some implementations, the customized control interface can be advertised by the very same application that is served by server 115. The customized control interface can be tailored to an application served by server 115 so that, e.g., a user can navigate and interact with that application in an intuitive and/or efficient manner.

Figure 2:
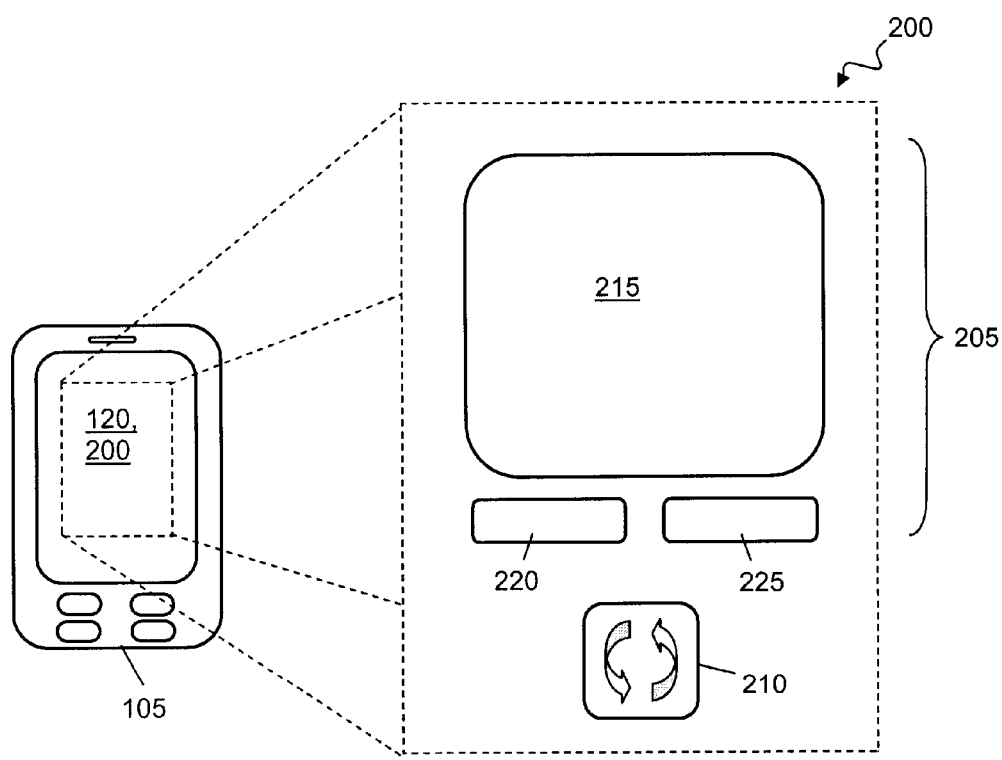
FIG. 2 is a schematic representation of a generic control interface.
Figure 3:
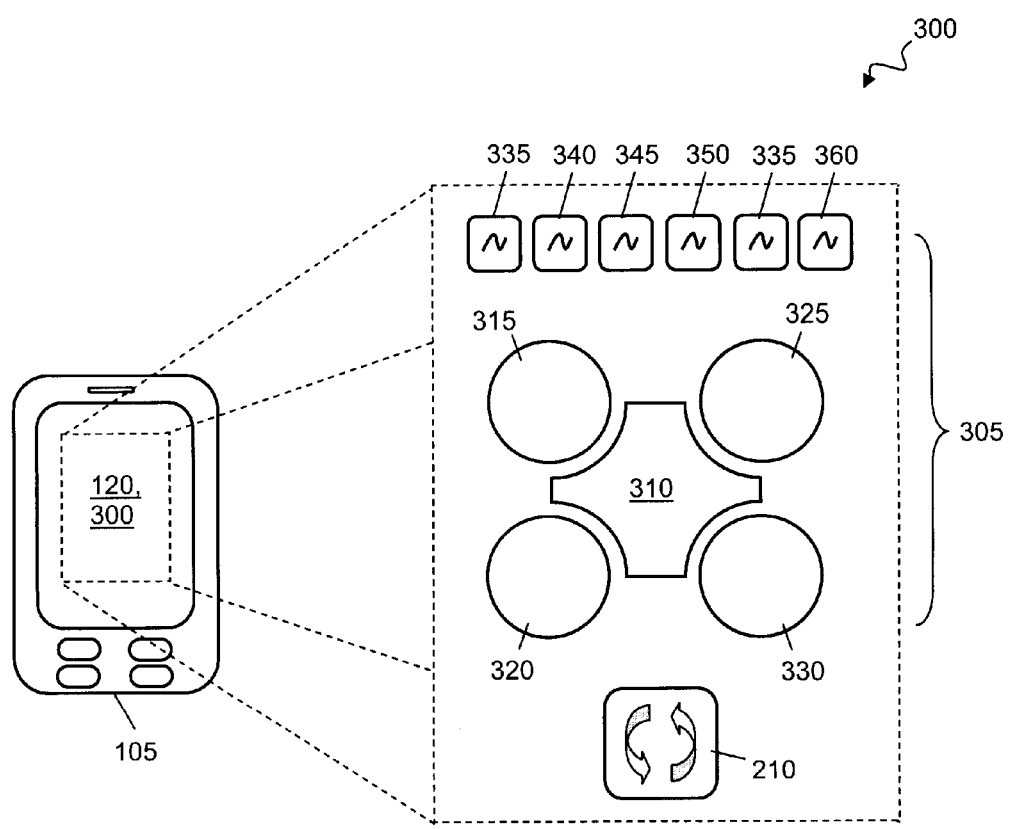
FIG. 3 is a schematic representation of a customized control interface.

FIG. 2 is a schematic representation of a generic control interface 200 and FIG. 3 is a schematic representation of a customized control interface 300. Either or both of control interfaces 200, 300 can be displayed on display screen 130 of control device 105. However, in the illustrated implementation, control interfaces 200, 300 are displayed in the same portion of display screen 130 and hence are not displayed simultaneously on display screen 130. Rather, as discussed further below, a user can toggle between displaying control interface 200 and displaying control interface 300.

Generic control interface 200 includes a set of generic controls 205 and an interface toggle control 210. Generic control set 205 is a collection of graphical elements that resemble controls which are generically applicable to a variety of different applications. In some implementations, the graphical elements in generic control set 205 can resemble familiar physical elements. For example, in the illustrated implementation, generic control set 205 includes a trackpad representation 215 and representations of a pair of buttons 220, 225 such as are commonly found on a laptop computer. Interface toggle control 210 is a graphical element that, in the illustrated implementation, resembles a button. Interface toggle control 210 includes graphical indicia indicating that a toggling event occurs upon user interaction with toggle control 210.

In some implementations, generic control interface 200 is the default control interface 200 for control device 105 and capable of allowing a user to input generic commands. For example, user interaction with trackpad representation 215 can be interpreted as a command that a cursor be moved in a certain direction, user interaction with button representation 220 can be interpreted as a "left click" command, and user interaction with button representation 225 can be interpreted as a "right click" command. In some implementations, generic control interface 200 can be "native" to control device 105 in that the manufacturer of generic control interface 200 installs or otherwise provides control device 105 with generic control interface 200, e.g., before delivery to customers.

Customized control interface 300 includes a set of customized controls 305 and interface toggle control 210. Customized control set 305 is a collection of graphical elements that resemble controls which are tailored to be applicable to the operations performed by one or more applications. In some implementations, the graphical elements in customized control set 305 can resemble familiar physical elements. For example, in the illustrated implementation, customized control set 305 includes a directional pad representation 310, a collection of button representations 315, 320, 325, 330, and a collection of key representations 335, 340, 345, 350, 355, 360. Buttons 315, 320, 325, 330 are disposed diagonally between the X, Y axes of directional pad representation 310. Each key representation 335, 340, 345, 350, 355, 360 includes an alphanumeric or other indicium.

Customized control interface 300 is tailored to the operations of an application serviced by a server 115. For example, the arrangement of directional pad representation 310 and button representations 315, 320, 325, 330 can correspond to the arrangement of graphical elements in a graphical representation of a web site served by server 115. As yet another example, the indicia represented on key representations 335, 340, 345, 350, 355, 360 can change in response to user navigation through different web applications to, e.g., identify commands that are available for each application or to provide information regarding the status of each application.

Figure 4:
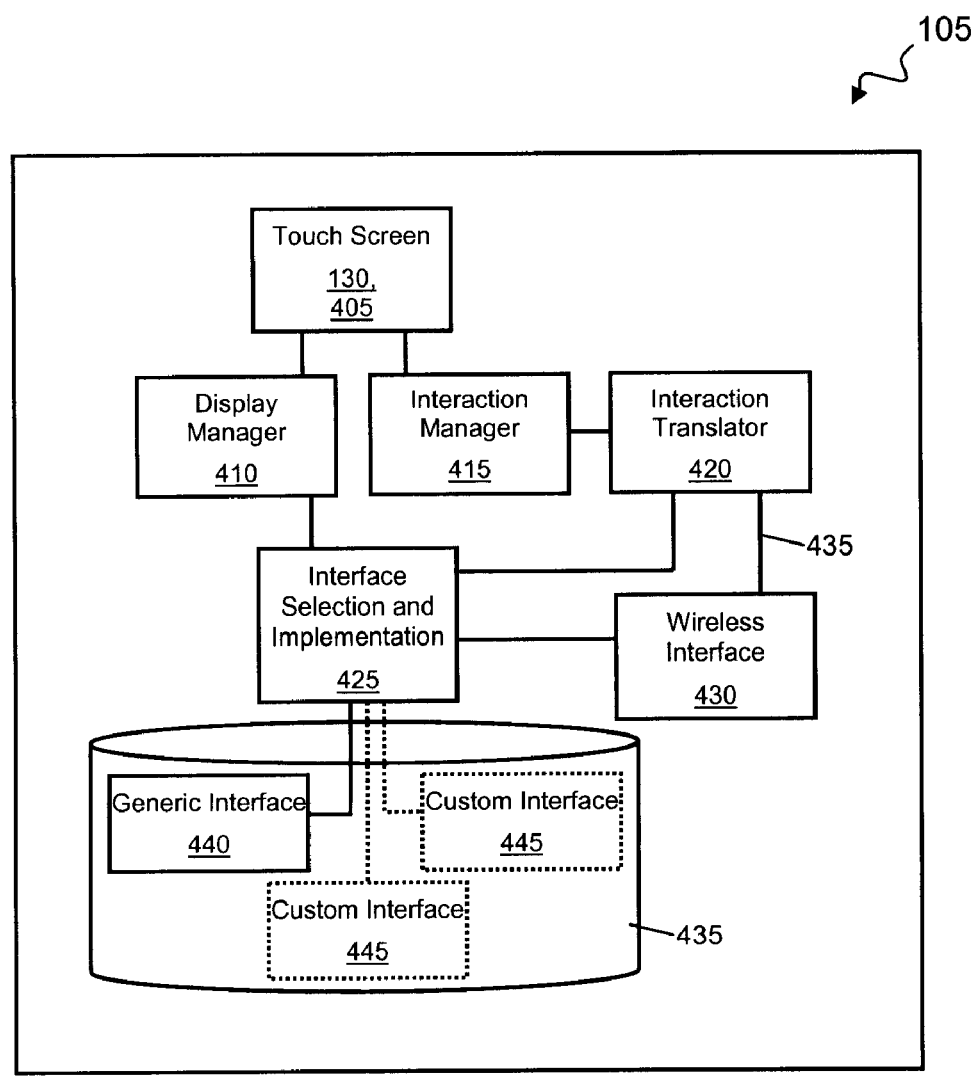
FIG. 4 is a schematic representation of one implementation of a control device.

FIG. 4 is a schematic representation of one implementation of a control device 105. Control device 105 includes a collection of electrical components that can be used to implement a variety of customized control interfaces.

In particular, control device 105 includes a touchscreen display 405, a display manager 410, an interaction manager 415, an interface selection and implementation unit 420, an interaction translator 425, a wireless interface 430, and a data store 435.

Touchscreen display 405 is a display screen that acts as both an input and an output. In particular, touchscreen display 405 can both present graphical representations such as control interfaces 200, 300 and identify user interaction with those representations.

Display manager 410 a device that is configured to manage the presentation of graphical representations on touchscreen display 405. Display manager 410 can include, e.g., a video memory, a graphics controller, and one or more interfaces for interfacing with touchscreen display 405, interface selection and implementation unit 420, and other components of touchscreen display 405.

Interaction manager 415 a device that is configured to manage the identification of user interaction with graphical representations on touchscreen display 405. Interaction manager 415 can include, e.g., an interface with the sensor elements in touchscreen display 405 and an interpreter for condensing the output from such sensors elements into a condensed description of the user interaction that caused the output. For example, interaction manager 415 can interpret sensor element output as a user's finger being stationary at a certain location on touchscreen display 405 or as user's finger being moved along a certain trajectory across touchscreen display 405.

Interface selection and implementation unit 420 is a device that is configured to select and implement the interface that is to be represented on touchscreen display 405, as well as the rules used by interaction translator 425 to translate that user interaction into higher level commands. Interface selection and implementation unit 420 can be implemented by one or more data processing devices that perform operations in accordance with one or more sets of machine readable instructions. For example, the processor of a computer, a telephone, a music player, a PDA, a video game console, or the like can implement interface selection and implementation unit 420.

Interface selection and implementation unit 420 can select and implement a control interface in response to notifications received from primary client 110 over wireless interface 430, as discussed further below.

Interaction translator 425 is a device that is configured to translate condensed descriptions of user interaction with touchscreen display 405 into higher level commands. Interaction translator 425 can translate those descriptions of user interaction in accordance with different sets of rules. The rules used by interaction translator 425 can correspond to the control interface presented on touchscreen display 405 with which a user interacts. For example, in response to a user interacting with generic control interface 200, interaction translator 425 can translate the user interaction in accordance with a first set of rules. However, in response to a user interacting with customized control interface 300, interaction translator 425 can translate the user interaction in accordance with a different set of rules. At least some of the higher level commands can embody the operations performed by the application for which the control interface is customized. Examples of such higher level commands include "move [a character in a video game] left," "go back one page," "skip the next song," and the like.

Wireless interface 430 is a device that is configured to interface with one or more wireless transmitters and/or receivers to send and receive information. Wireless interface 430 can interface with a transmitter and/or receiver and allow control device 105 to communicate with primary client 110 over data communication path 125 (FIG. 1).

Data store 435 is a collection of one or more data storage devices that provide persistent data storage in control device 105. Data store 430 can be implemented using, e.g., solid state memory devices.

Among the data that can be stored at data store 430 are a description of a generic interface 440 and descriptions of one or more custom interfaces 445. Generic interface description 440 includes information describing the representation of a generic control interface on touchscreen display 405 and the rules which are to be used to translate user interaction with that representation into higher level commands. A custom interface description 445 includes information describing the representation of a custom control interface on touchscreen display 405 and the rules which are to be used to translate user interaction with that representation into higher level commands. Data store 430 need not store a custom interface description 445 at all times and, at times, may store more than one such custom interface description 445. The appropriate interface description 440, 445 can be selected and implemented by interface selection and implementation unit 420, e.g., in response to a notification received from primary client 110, as discussed further below.

Figure 5:
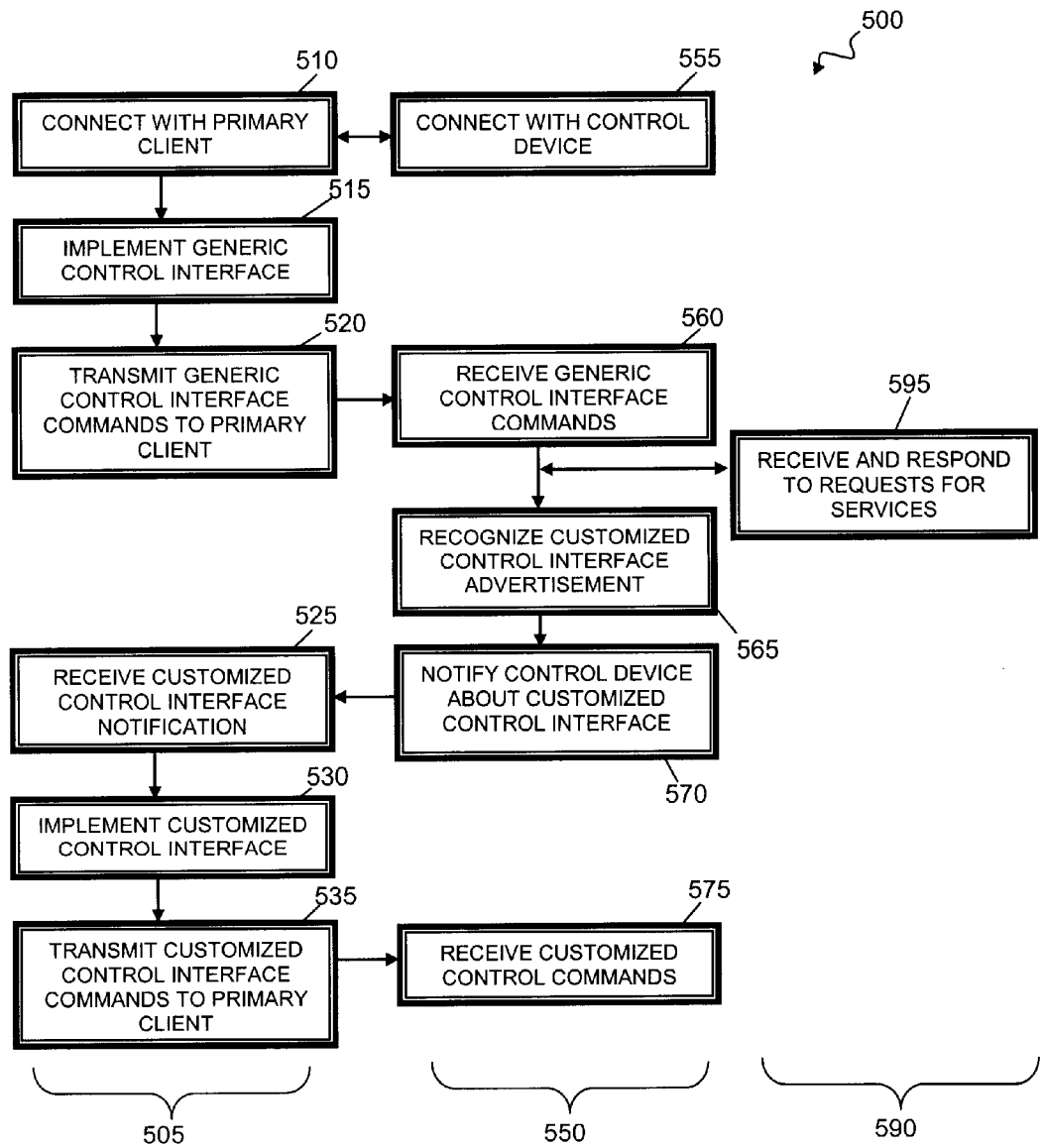
FIG. 5 is a flow chart of a process for implementing a customized control interface on a display screen.

FIG. 5 is a flow chart of a process 500 for implementing a customized control interface on a display screen. Process 500 can be performed in a system that includes a control device, a primary client, and a server. For example, process 500 can be performed in system 100 (FIG. 1). For the sake of clarity, activities performed by the control device in such a system are presented in leftmost column 505, activities performed by the primary client in such as system are presented in middle column 550, and activities performed by the server in such as system are presented in rightmost column 590. In some implementations, the server in the system performing process 500 can also serve the web application for which the control interface is customized, although this is not necessarily the case.

The control device in the system performing process 500 connects with the primary client at box 510 and the primary client in the system connects with the control device at box 555. Either the control device or the primary client can initiate the connection to establish, e.g., a wireless data link. Establishing the data link can include one or more identification, handshaking, synchronization, authentication or other activities. If process 500 is performed in the context of system 100 (FIG. 1), the connection places control device 105 and primary client 110 in data communication over path 125.

The control device in the system performing process 500 can implement a generic control interface at box 515. In some implementations, implementing the generic control interface includes both presenting a generic control interface representation on the display screen of the control device and ensuring that user interaction with that representation is translated into higher level commands using a set of rules tailored for that purpose. Although box 515 is shown after box 510 in process 500, the generic control interface can be implemented before or while a connection between the control device and the primary client is established.

The control device in the system performing process 500 can translate user interaction with the generic control interface representation into high level commands and transmit data regarding those commands to the primary client at box 520. The primary client receives those commands at box 560. In some instances, the primary client itself can respond to those commands. In other instances, the primary client can relay the received command to the server in the system. For example, if process 500 is performed in the context of system 100 (FIG. 1), primary client 110 can communicate data describing the commands to server 115 over data communication path 135 as one or more requests for services.

In such instances, the server in the system performing process 500 receives and responds to those requests for services at box 595. The response can include instructions or other information that is returned to the primary client and, when appropriate, the control device.

At some point, the response may include an advertisement of a customized control interface. In response, the primary client in the system performing process 500 recognizes that a customized control interface is being advertised at box 565.

The nature of the advertisement, and the recognition of that advertisement by the primary client, can reflect the structure and capabilities of the primary client and the server. For example, as discussed further below, in some implementations, a server can serve a web application that advertises a customized control interface. Such an advertisement can be recognized by a web browser.

The primary client in the system performing process 500 notifies the control device about the customized control interface at box 570. The notification can inform the control device that the customized control interface is available to be implemented. In some implementations, the notification can identify the location where the customized control interface is available. In some implementations, the notification itself can include instructions for implementing the customized control interface. In other implementations, instructions for implementing the customized control interface are transmitted from the primary client to the control device only response to a message from the control device to the primary client indicating that the customized control interface is to be implemented.

The control device in the system performing process 500 receives the notification of the customized control interface at box 525. In some implementations, the control device can determine whether implementation of the customized control interface is desired. For example, the control device can present a graphical representation to a user that describes the availability of the customized control interface and inquires as to whether implementation is desired. For example, such a graphical representation can include a interface toggle control 210 (FIGS. 2, 3). In other implementations, the control device implements the customized control interface automatically in response to the notification, i.e., without explicit instructions from the user indicating that implementation of that particular interface is desired.

The control device in the system performing process 500 implements the customized control interface at box 530. In some implementations, implementing the customized control interface includes presenting a customized control interface representation on the display screen of the control device and ensuring that user interaction with that representation is translated into higher level commands using a set of rules tailored for that purpose. In some implementations, both a customized control interface representation and a generic control interface representation can be presented on the display screen of a control device simultaneously. In such implementations, user interaction with the generic control interface representation is translated into higher level commands using a set of rules tailored to the generic control interface whereas user interaction with the customized control interface representation is translated into higher level commands using a set of rules tailored to the customized control interface.

The control device in the system performing process 500 can translate user interaction with the customized control interface representation into high level commands and transmit data describing those commands to the primary client at box 535. The primary client receives those commands at box 575. In some instances, the primary client itself can respond to those commands. In other instances, the primary client can relay the received command to the server in the system. For example, if process 500 is performed in the context of system 100 (FIG. 1), primary client 110 can communicate data describing the commands to server 115 over data communication path 135. In some instances, the server in the system performing process 500 responds to those commands with instructions or other information that is returned to the primary client and, when appropriate, the control device.

Figure 6:
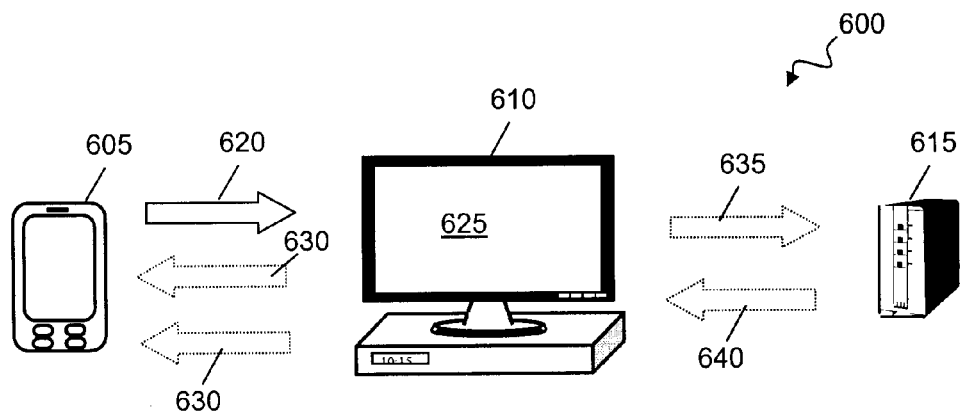
FIG. 6 is a schematic representation of the exchange of information after implementation of a customized control interface.

FIG. 6 is a schematic representation of the exchange of information after implementation of a customized control interface. For example, the represented information exchange can occur at boxes 520, 560 or boxes 535, 575 in process 500 (FIG. 5). The illustrated system includes a control device 605, a primary client 610, and a server 615. In some implementations, control device 605 can be control device 105, primary client 610 can be primary client 110, and server 615 can be server 115.

After a customized control interface has been implemented, control device 605 transmits data 620 describing a high level command to primary client 610. Primary client 610 receives data 620. In some instances, primary client 610 can itself respond to the command described by data 620. For example, primary client 610 may change the graphical presentation on a display screen 625 or transmit a response 630 to the command to control device 605.

In other instances, primary client 610 relays all or a portion of data 620 to server 615 in one or more messages 635. Server 615 can receive one or more messages 635 and provide service data 640 that is returned to primary client 610. Primary client 610 can receive service data 640. In some instances, primary client 610 will itself act in response to service data 640, e.g., by changing the graphical presentation on a display screen 625. In some instances, primary client 610 can relay all or a portion of service data 640 on to control device 605 in one or more messages 635. Control device 605 can act in response to messages 635, e.g., by changing a graphical presentation on its own display screen.

In some implementations, communications between control device 605 and primary client 610 are always mediated by server 615. In other words, primary client 610 cannot respond to the command described by data 620 without first relaying all or a portion of data 620 to server 615. Server 615 can service data 640 that instructs primary client 610 how to respond to the command described by data 620.

In some implementations, primary client 610 can relay all or a portion of data 620 to server 615 using asynchronous JavaScript and XML (i.e., "AJAX") techniques. For example, messages 635 can use XMLHttpRequest (XHR) polling or a hanging Hypertext Transfer Protocol (i.e., "HTTP") GET request can be used to allow user interaction with the control device 605 to change the activities performed by primary client 610.

Different use examples of such customized control interfaces include:

using a smart phone control device 605 to connect to a media extender primary client 610 and browse a list of video files that are present both on the extender primary client 610 and on a video file server 615 on a local network. For example, a user can input a query for video files into control device 605 using a generic or a customized control interface. Data 620 describing the query is transmitted to media extender primary client 610. Media extender primary client 610 responds to the query by relaying the query to video file server 615 in message 635 and by conducting a local search for responsive video files. Video file server 615 receives message 635, conducting its own search for responsive video files, and returns a list of responsive video files to media extender primary client 610 in service data 640. Media extender primary client 610 combines the responsive video files identified in service data 640 with the responsive video files identified in its own local search and identifies those video files in a list on display screen 625.

using a smart phone control device 605 to connect to an Internet protocol television primary client 610 and control its web browser. For example, the smart phone control device 605 can present a list of website bookmarks from which a user can select using a generic control interface. Data 620 describing the user selection is transmitted to Internet protocol television primary client 610. Internet protocol television primary client 610 responds to data 620 by navigating to the selected website. In particular, internet protocol television primary client 610 requests service of the selected website from a website server 615 in a message 635. The website server 615 returns service data 640, which internet protocol television primary client 610 uses to present the selected website on display screen 625. The selected website can include information advertising that a control interface which has been customized to that website is available. A notification of this availability of this customized control interface can be transmitted from internet protocol television primary client 610 to smart phone control device 605 in service data 640. The customized control interface can be implemented by smart phone control device 605 as desired and additional subsequent commands can be transmitted from smart phone control device 605 to internet protocol television primary client 610 in additional data 620.

using a collection of smart phone control devices 605 connect to a video game system primary client 610 to a video game server 615 and implement customized control interfaces. User interaction with the customized control interfaces are translated into high level commands. The commands are transmitted from the smart phone control devices 605 to the video game system primary client 610 and relayed to the video game system server 615. Server 615 service data 640 instructing video game primary client 610 how to respond to the commands.

Figure 7:
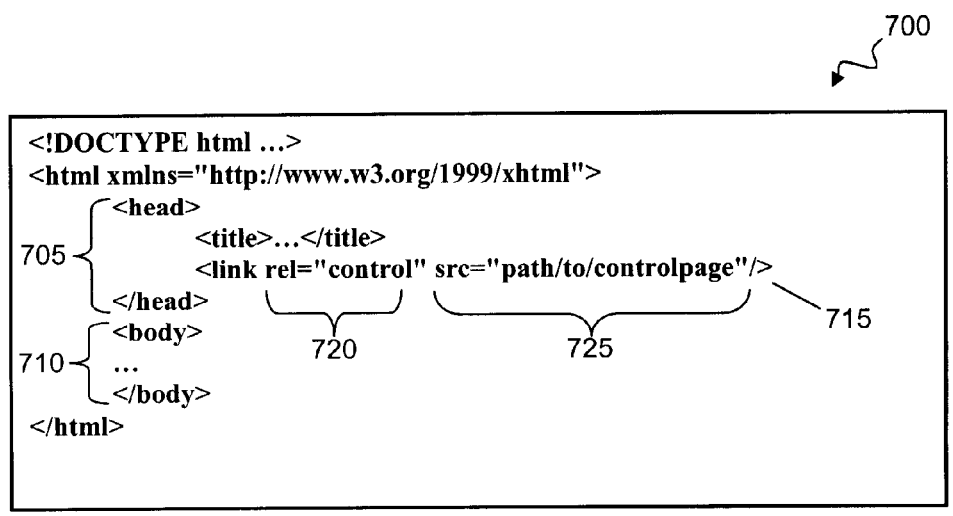
FIG. 7 is a schematic representation of a web application that advertizes a customized command interface.

FIG. 7 is a schematic representation of a web application 700 that advertizes a customized command interface. In the illustrated implementation, web application 700 is structured using HTML and includes a head 705 and a body 710. Head 705 advertizes the customized command interface using a link element 715. A link element is an element in an web application that specifies a relationship to another resource. In web applications structured using HTML, the link element is a sub-element of the head of the web application, as shown.

Link element 715 includes the a type attribute 720 and a resource identifying attribute 725. The name of type attribute 720 (i.e., "rel") specifies that link element 715 is a forward link. The value of type attribute 720 (i.e., "control") indicates that the relationship between web application 700 and the identified resource is a control relationship. In particular, the value of type attribute 720 indicates that the identified resource is a command interface that has been customized for interaction with web application 700.

The name of resource identifying attribute 725 (i.e., "src") specifies that the Uniform Resource Identifier of the control resource is provided in link element 715. The value of resource identifying attribute 725 (i.e., "path/to/controlpage") identifies the control resource. The value of resource identifying attribute 725 can be a uniform resource identifier (URI) that identifies where the customized command interface is available on the Internet. Other resource identifying attributes (i.e., "HREF") can specify that the Uniform Resource Locator is provided in link element 715. In general, the uniform resource identifier is not visible to a user viewing the rendered version of web application 700, i.e., the version of web application 700 that is displayed in a browser without showing the page source.

A browser that downloads web application 700 can recognize the customized command interface using link element 715 and download it automatically. A notification of the download can be provided to a control device. In some implementations, the notification can identify the location where the customized control interface is available. In some implementations, the notification includes instructions for implementing the customized command interface.

In some implementations, the browser that downloads web application 700 can be a W3C standards-compliant web browser that resides on a primary client. The web browser can parse web application 700 to recognize the customized command interface advertisement and display the web application 700.

In some implementations, web application 700 can advertize multiple command interfaces that each are customized not only for interaction with web application 800 but also for the characteristics of different control devices. For example, a command interface can be customized according to the capabilities of a control device such as, e.g., if touch events are available. The browser that downloads web application 700 select one of the multiple customized command interfaces for transmission to a specific control device based on the characteristic of that control device. For example, in some implementations, the browser that downloads web application 700 can determine the user agent of the control device and select a customized command interface based on the results of the inspection.

Advertizing a customized command interface on an web application provides a number of advantages. For example, a command interface that is customized to a specific web application can be downloaded automatically when a browser navigates to that same web application. Thus, there is no need for a customized command interface to have been downloaded in advance or from another web site. Further, the creator of the customized command interface can publish and update the customized command interface as needed, without express approval from the manufacturer of the control device and without concern for legacy customized command interfaces. Moreover, the flexibility of the system is improved, since the same customized command interface can be advertized on a number of different web applications or each different web application can advertize a different—and hence uniquely customized—command interface.

In some implementations, a web application can advertize a single command interface that is customized not only for interaction with a web application but also for the characteristics of different control devices. For example, in some implementations, a customized command interface can itself perform activities to determine the characteristic of a control device and change the customization of the control interface accordingly. For example, a customized command interface can use JavaScript object detection to determine the capabilities of the control device (for example, if touch events are available). The customized command interface can customize the presentation of the customized command interface and the rules used to translate user interaction with the customized control interface into high level commands according to the determined capabilities by, e.g., updating the document object model, downloading extra resources, or the like.

Figure 8:
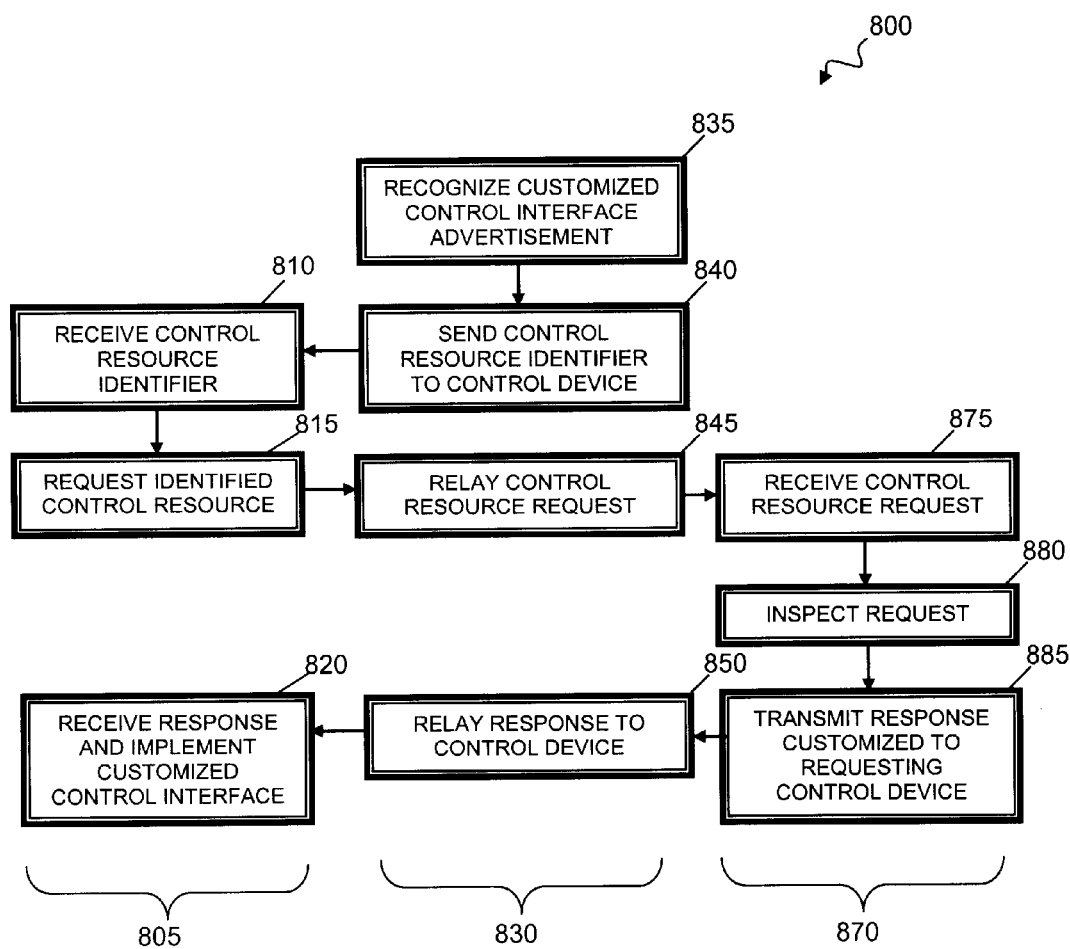
FIG. 8 is a schematic representation of a process for implementing a customized control interface on a display screen.

FIG. 8 is a schematic representation of a process 800 for implementing a customized control interface on a display screen. The customized control interface implemented in process 800 can be customized not only for interaction with a web application but also for the characteristics of the control devices on which the customized control interface is implemented.

Process 800 can be performed in a system that includes a control device, a primary client, and a server. For example, process 800 can be performed in system 100 (FIG. 1) in which server 115 serves web application 700 (FIG. 7). Process 800 can be performed in isolation or in conjunction with other activities. For example, process 800 can be performed at boxes 565, 570, 525, 530 in process 500 (FIG. 5). For the sake of clarity, activities performed by the control device in such a system are presented in leftmost column 805, activities performed by the primary client in such as system are presented in middle column 830, and activities performed by the server in such as system are presented in rightmost column 870.

The primary client in the system performing process 800 recognizes that a customized control interface is being advertised at box 835. For example, the primary client can identify link element 715 in web application 700 (FIG. 7).

The primary client also notifies the control device about the customized control interface, e.g., by sending a control resource identifier to the control device at box 840. For example, the primary client can send the value of resource identifying attribute 725 in web application 700 (FIG. 7) to the control device.

The control device in the system performing process 800 receives the control resource identifier at box 810 and requests the identified control resource at box 815. The request can request that in the customized control interface identified by the control resource identifier be downloaded to the control device from a location identified in identifying attribute 725 in web application 700 (FIG. 7).

The primary client can receive the control resource request and relay it to the server at box 845. The server in the system performing process 800 receives the control resource request at box 875. In general, the control resource request will include information characterizing the control device. The server inspects the request to identify characteristics of the control device at box 880. For example, the server can determine the identify the application, the operating system, and/or the versions thereof at the control device that requests the control resource (i.e., "sniffing"). The server can transmit a response to the control resource request that is itself customized to the characteristics of the requesting control device at box 885. The response can include a set of instructions for implementing a control interface that is customized to the characteristics of the control device. The characteristics can be those characteristics identified from the control resource request.

The primary client can receive the response to the control resource request and relay it to the control device at box 850. The control device in the system performing process 800 can receive the response and implement the control interface that is customized to the characteristics of the control device at box 820.

Figure 9:
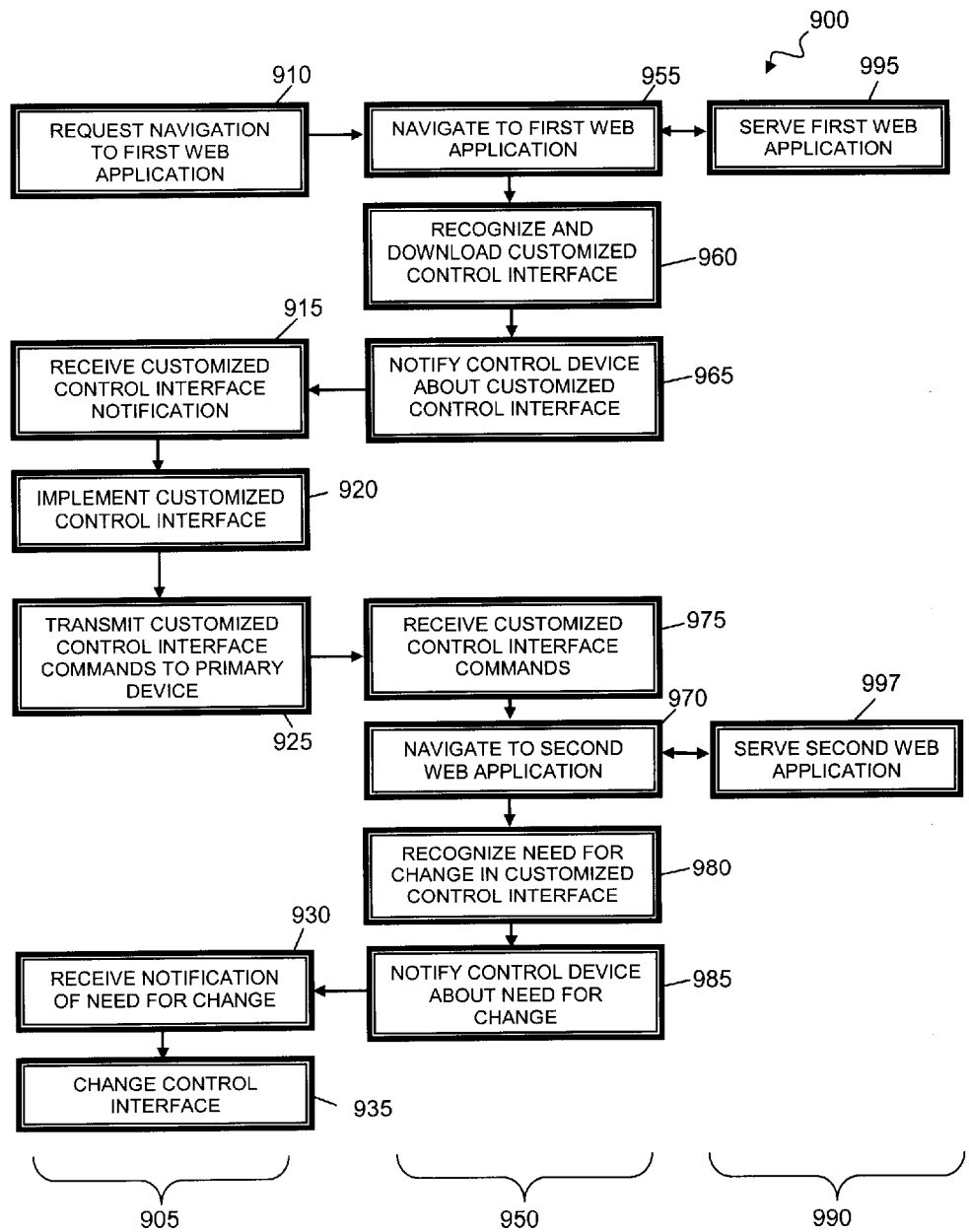
FIG. 9 is a flow chart of a process for implementing a customized control interface on a display screen.

FIG. 9 is a flow chart of a process 900 for implementing a customized control interface on a display screen. Process 900 can be performed in a system that includes a control device, a primary client, and a server. For example, process 900 can be performed in system 100 (FIG. 1). Process 900 can be performed in isolation or in conjunction with other activities. For example, process 900 can be performed in conjunction with, or as part of, process 500 (FIG. 5). For the sake of clarity, activities performed by the control device in such a system are presented in leftmost column 905, activities performed by the primary client in such as system are presented in middle column 950, and activities performed by the server in such as system are presented in rightmost column 990. In some implementations, the server in the system performing process 500 can also serve the web application for which the control interface is customized, although this is not necessarily the case.

The control device in the system performing process 900 transmits a command requesting navigation to a first web application at box 910. The transmitted request can be either a generic control interface command or a customized control interface command. When process 900 is performed in conjunction with process 500, the request can be transmitted at either of boxes 520, 535 (FIG. 5).

The primary client in the system performing process 900 receives the request and navigates to the first web application at box 955. The first web application is served by the server at box 995. In the process of retrieving the first web application, the primary client can recognize and download an interface that is customized for controlling the operations of the first web application at box 960. In some implementations, the customized control interface can be downloaded by the primary client automatically, i.e., without additional input from a user. When process 900 is performed in conjunction with process 500, recognition and download of the customized control interface can be performed at box 565 or in comparable activities that occur after box 575 (FIG. 5).

The primary client also notifies the control device about the customized control interface at box 965. When process 900 is performed in conjunction with process 500, the notification can be performed at box 570 or in comparable activities that occur after box 575 (FIG. 5).

The control device in the system performing process 900 receives the notification of the customized control interface at box 915, implements the customized control interface at box 920, translates user interaction with the customized control interface representation into high level commands, and transmits data describing those commands to the primary client at box 925. The primary client receives those commands at box 970. When process 900 is performed in conjunction with process 500, the activities of boxes 915, 920, 925, 970 can be performed at boxes 525, 530, 535, 575 respectively, or in comparable activities that occur after box 575 (FIG. 5).

At some point, the primary client in the system performing process 900 navigates to a second web application at box 975. The second web application is served by the server at box 997. In some instances, the primary client navigates to the second web application in response to a command received at box 970. In the process of retrieving the second web application, the primary client can recognize the need for a change in the control interface at box 980. In some implementations, a need for a change in the control interface is recognized in response to the second web application failing to advertise the customized control interface that is presently implemented at the control device. For example, the second web application can advertise the availability of a different customized control interface or fail to advertise any customized control interface at all.

In other implementations, a need for a change in the customized control interface is not automatically recognized in response to the second web application failing to advertise the customized control interface. For example, the primary client may require that the user navigate a certain number of web applications away from the first web application or to a collection of web applications hosted by another party before recognizing the need for a change.

In other implementations, the need for a change in the control interface can be recognized even if an web application advertises the same customized control interface. For example, the primary client can calculate if the customized control interface occupies too large a fraction of a display screen of the control device relative to the amount of user interaction with the customized control interface and may determine that a change is needed based on the results of the calculation.

The primary client in the system performing process 900 notifies the control device about the need for a change in the customized control interface at box 985. When a different customized control interface is advertised on the second web application, the notification that a change is needed can include a notification that a different customized control interface is available to be implemented. In some implementations, such a notification can identify the location where the customized control interface is available. In some implementations, such a notification includes instructions for implementing the different customized control interface. When process 900 is performed in conjunction with process 500, the notification of the need for a change can be performed after box 575 (FIG. 5).

The control device in the system performing process 900 receives the notification of the need for change in the customized control interface at box 930 changes the customized control interface at box 935. The control device can change the customized control interface by ending presentation of the representation of the customized control interface on a display screen and ending translation of user interaction into higher level commands using a set of rules tailored to the customized control interface. In instances where a different customized control interface is available, the control device can implement the different customized control interface. When process 900 is performed in conjunction with process 500, the activities of boxes 930, 935 can be performed after box 575 (FIG. 5).

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems, methods, and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method for controlling a web-based application, the method comprising:
   providing, from a server system, a web page that includes
      a web-based application suitable for execution on a primary client and
      a uniform resource identifier specifying a control interface for controlling the execution of the web-based application by the primary client, the control interface configured to permit a user to control one or more functions of the web-based application from a mobile device; and
   transmitting, from the server system, the control interface specified by the uniform resource identifier to the primary client for use by the mobile device to control the one or more functions of the web-based application.

2. The method of claim 1, further comprising the server providing a second web page that includes the uniform resource identifier specifying the control interface.

3. The method of claim 1, wherein the uniform resource identifier is not visible to a user viewing a rendering of the web page by the primary client.

4. The method of claim 1, wherein the transmission of the control interface occurs automatically when a web browser of the primary client accesses the provided web page that includes the web-based application and the uniform resource identifier.

5. The method of claim 1, wherein the transmission of the control interface occurs in response to a user selection of a visible representation of the uniform resource identifier.

6. The method of claim 1, wherein the control interface comprises visual elements that are customized to control the web page or the web-based application from an electronic device comprising a display screen acting as both an input and an output.

7. The method of claim 1, wherein the web page is provided to a television set primary client.

8. The method of claim 1, wherein the web page is provided to a desktop personal computer primary client.

9. The method of claim 1, wherein the web-based application includes media player functionality.

10. The method of claim 1, wherein:
the server provides the web page to a data processing device primary client; and
the data processing device primary client and the mobile device are in data communication over a wireless data communication path.

11. The method of claim 10, wherein the data processing device primary client and the mobile device are associated with a same user.

12. The method of claim 11, further comprising the server storing a record of the associations of the data processing device primary client and the mobile device with the same user.

13. The method of claim 11, further comprising the server receiving credentials identifying the same user from both the data processing device primary client and the mobile device.

14. The method of claim 1, wherein the uniform resource identifier identifies where the control interface for the web-based application is available on the Internet.

15. The method of claim 1, further comprising:
receiving, at the primary client, the control interface transmitted from the server system;
relaying, from the primary client to the mobile device, the control interface;
receiving, at the mobile device, the control interface;
implementing, at the mobile device, the control interface; and
transmitting, by the mobile device, commands for controlling the web-based application to the primary client using the customized control interface.

16. A method comprising:
a mobile device transmitting commands to a primary client that is separate from the mobile device, using a generic control interface;
the mobile device receiving notification of a control interface customized for use in controlling one or more functions of a web-based application from the mobile device, wherein the notification of the control interface is transmitted to the mobile device automatically in response to the primary client navigating to the web-based application;
the mobile device implementing the customized control interface; and
the mobile device transmitting, to the primary client that is separable from the mobile device, commands for controlling the web-based application to the primary client using the customized control interface.

17. The method of claim 16, wherein:
the mobile device comprises a display screen configured to act as both an input and an output; and
the method further comprises the mobile device receiving instructions for presenting a representation of the customized control interface on the display screen and rules for translating user interaction with the customized control interface into high level commands tailored to the web-based application.

18. The method of claim 16, wherein the control interface is also customized to the mobile device.

19. The method of claim 16, further comprising the mobile device transmitting commands for controlling a second web-based application to the primary client using the customized control interface, wherein the control interface is also customized for use in controlling one or more functions of the second web-based application.

20. The method of claim 16, wherein:
the mobile device comprises a display screen configured to act as both an input and an output; and
the method further comprises the mobile device switching between presenting the generic control interface and the customized control interface in response to user interaction with the display screen.

21. The method of claim 16, wherein the notification of the control interface comprises a uniform resource identifier that identifies where the control interface for the web-based application is available on the Internet.

22. A system for controlling a web-based application, the system comprising:
one or more servers providing:
a web page that includes
a web-based application suitable for execution on a primary client and
a uniform resource identifier specifying a control interface for controlling the execution of the web-based application by the primary client, the control interface configured to permit a user to control one or more functions of the web-based application from mobile device;
instructions for implementing the control interface on the mobile device, the instructions identifiable using the uniform resource identifier; and
one or more data exchange interfaces for conveying the web page and the instructions to other data processing devices over one or more data communication paths.

23. The system of claim 22, wherein the notification of the control interface comprises a uniform resource identifier that identifies where the control interface for the web-based application is available on the Internet.

24. The system of claim 22, the uniform resource identifier identifies where the control interface for the web-based application is available on the Internet.

25. A device comprising:
a web server serving a web application suitable for execution on a primary client, the web application comprising a link element specifying a relationship between the web application and a customized control interface that is implementable on an electronic device that is separate from the primary client and that includes a display screen acting as both an input and an output, the customized control interface being customized to control operations performed by the web application, when the web application is executing on the primary client, via input received over the display screen of the electronic device, the link element comprising a uniform resource identifier that identifies where the customized command interface is available, and wherein the web application is programmed to provide the link element for use by the electronic device.

26. The device of claim 25, wherein the web application comprises a head and a body, the link element being a sub-element of the head.

27. The device of claim 25, wherein the link element specifies a forward link from the web application to the control interface.

28. The device of claim 25, wherein the web application is structured using HTML.

29. The device of claim 25, wherein the control interface is also customized to the electronic device which is to implement the control interface.

30. The device of claim 25, wherein the web server is a media server.

31. The device of claim 25, wherein the web server is a video game server.

32. The device of claim 25, wherein the web server comprises a second web application, the second web application comprising a second link element specifying a relationship between the second web application and the customized control interface, the customized control interface also being customized to control operations performed by the second web application.

33. The device of claim 25, further comprising:
the electronic device that includes a display screen acting as both an input and an output; and
the primary client in data communication with the electronic device, the data communication including commands for controlling the web application.

34. The device of claim 33, wherein the primary client is a television set or a personal computer.

35. The system of claim 25, wherein the system further comprises:
the electronic device; and
at least one other data processing device, a first of the at least one other data processing device being a primary client separate from, and in data communication with the electronic device, the data communication including commands for controlling the web-based application.

36. The system of claim 35, wherein the first of the at least one other data processing device is a television set or a personal computer.

* * * * *

UNITED STATES PATENT AND TRADEMARK OFFICE
CERTIFICATE OF CORRECTION

PATENT NO. : 8,375,328 B2
APPLICATION NO. : 12/616516
DATED : February 12, 2013
INVENTOR(S) : Justin Koh et al.

It is certified that error appears in the above-identified patent and that said Letters Patent is hereby corrected as shown below:

On the Title Page:

Column 2 Item (57) (Abstract), line 3-4, delete "performed" and insert -- performed by --, therefor.

In the Claims:

Column 17, line 54, in Claim 16, delete "separable" and insert -- separate --, therefor.

Column 18, line 29, in Claim 22, delete "from" and insert -- from a --, therefor.

Column 20, line 6, in Claim 35, delete "system" and insert -- device --, therefor.

Column 20, line 14, in Claim 36, delete "system" and insert -- device --, therefor.

Signed and Sealed this
Fourteenth Day of May, 2013

Teresa Stanek Rea
*Acting Director of the United States Patent and Trademark Office*